(12) United States Patent
Funk

(10) Patent No.: US 7,692,573 B1
(45) Date of Patent: Apr. 6, 2010

(54) SYSTEM AND METHOD FOR CLASSIFICATION OF MULTIPLE SOURCE SENSOR MEASUREMENTS, REPORTS, OR TARGET TRACKS AND ASSOCIATION WITH UNIQUELY IDENTIFIED CANDIDATE TARGETS

(75) Inventor: Clarence J. Funk, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 106 days.

(21) Appl. No.: 12/165,779

(22) Filed: Jul. 1, 2008

(51) Int. Cl.
*G01S 13/04* (2006.01)
(52) U.S. Cl. .................................................. 342/90
(58) Field of Classification Search ............... 342/90; 702/181
See application file for complete search history.

(56) References Cited

U.S. PATENT DOCUMENTS 5,202,691 A * 4/1993 Hicks ........................... 342/90
5,379,044 A * 1/1995 Carlson et al. ................ 342/90

\* cited by examiner

*Primary Examiner*—Ian J Lobo
(74) *Attorney, Agent, or Firm*—Ryan J. Friedl; Kyle Eppele

(57) ABSTRACT

A system and methods enable efficient data association of input sensor data with uniquely identified candidate targets. The methods may use information provided by a target status history database, a target geolocation history database, and a target technical characteristics database, as well as data processing procedures provided by an algorithm rules database. The algorithm rules database provides procedures for generating target classification and identification information for input sensor data, for matching target classification and identification information obtained from input sensor data with information provided by the target technical characteristics database to generate an initial set of consistent, uniquely identified candidate targets, for estimating the minimal required speed of advance for each candidate target, for calculating weights and corresponding data association probabilities for the initial set of candidate targets with the input sensor data, and for selecting a final set of uniquely identified candidate targets with their data association probabilities.

20 Claims, 6 Drawing Sheets

SYSTEM AND METHOD FOR CLASSIFICATION OF MULTIPLE SOURCE SENSOR MEASUREMENTS, REPORTS, OR TARGET TRACKS AND ASSOCIATION WITH UNIQUELY IDENTIFIED CANDIDATE TARGETS

FEDERALLY-SPONSORED RESEARCH AND DEVELOPMENT

The System and Method for Classification of Multiple Source Sensor Measurements, Reports, or Target Tracks and Association with Uniquely Identified Candidate Targets was developed with funds from the United States Department of the Navy. Licensing inquiries may be directed to Office of Research and Technical Applications, Space and Naval Warfare Systems Center, San Diego, Code 2112, San Diego, Calif., 92152; telephone 619-553-2778; email: T2@spawar.navy.mil, reference Navy Case No. 97580.

BACKGROUND

The generation of comprehensive intelligence on targets of interest requires unique identification of the targets. Intelligence decisions are often limited by their dependence on the specific target identification method germane to the observing sensor. When the target is difficult to identify, the confidence in the target identification is low and is further complicated when there exist multiple observing sensors having varying levels of ambiguity in their observable characteristics. When targets are also difficult to detect, the difficulty of the target identification problem is compounded by the paucity of sensor data and its lack of temporal and spatial continuity.

There exists a need for a system and method that may reliably and accurately identify detected targets that are difficult to detect, difficult to identify, or both difficult to detect and difficult to identify.

DETAILED DESCRIPTION OF SOME EMBODIMENTS

Figure 1:
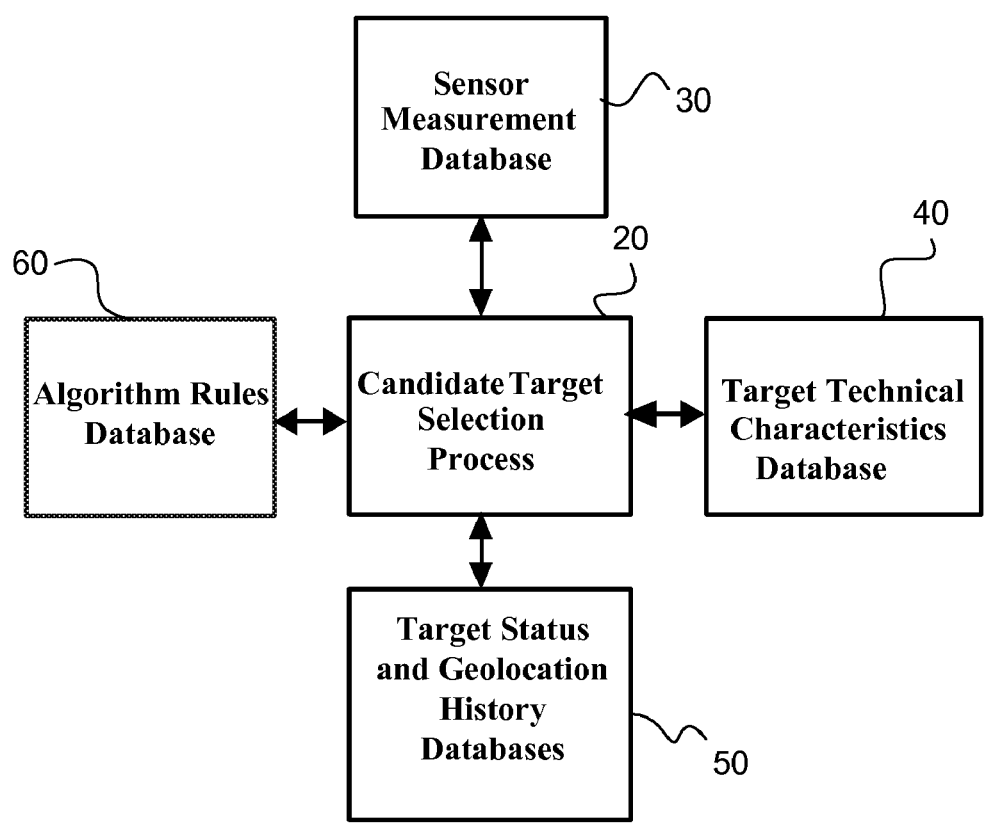
FIG. 1 shows a block diagram illustrating a system of interfaces between the candidate target selection process and various databases.

The multiple source data association problem for difficult-to-identify and difficult-to-detect targets may be formalized by the following precepts:

Measurement Attribute Vectors

There exist a finite number of targets belonging to a set of similar targets. These targets may only be uniquely identified using measurements of their attributes provided by a variety of sensors.

Measurement attribute vectors describe the measurements generated by the various sensor systems. Most sensor systems detect the energy that is emitted or reflected from a target of interest and generate measurements of the detected energy. Most imaging sensor systems measure energy reflected by the target, but some imaging sensors also illuminate the detected targets. Signal collection sensors measure either RF or acoustic energy that is emitted by the target. Measurements and Signals intelligence (MASINT) sensors measure other types of emitted or reflected energy. Human intelligence (HUMINT) sources of information about targets are the general exception to this observation.

A particular measurement attribute vector corresponds to the set of measurements of target characteristics that are generated by a single sensor system on a single target at a specific time. The measurement attribute vectors provided by different sensor systems contain distinct data elements corresponding to the target characteristics measured by the sensor system, e.g., acoustic sensor systems measure characteristics of the target propulsion system, optical sensor systems measure the size of the target and estimate the type, class, and model of the target, RF sensors systems measure the characteristics of the signals emitted by the target's radar and communication systems, and so on. Some of the measurement attribute vectors generated by a sensor system over a time interval may correspond to the same target. These measurement attribute vectors may be associated to create either a target report or a target track for a single target.

Some measurement attribute vectors are believed to correspond to different targets and are denoted as distinguished measurements. Some measurement attribute vectors are believed to correspond to a specific target and are denoted as unique measurements. An example of a unique measurement is a measurement of a communication signal with attributes, such as a call sign, that identify the target that transmitted the signal.

Data Association Rules

Knowledge that relates a sensor measurement attribute vector to a specific target may be described by a set of rules. For brevity, the expression "measurement attribute vector" shall simply be referred to as a "measurement" and the expression "sensor measurement, sensor report, and/or sensor target track" shall be referred to as "sensor data" in the remainder of this document. There are both general rules of logic and problem-specific rules that permit measurements to be included and excluded as candidate observations for a uniquely identified target.

There are several kinds of data association rules:

Rules for handling sensor data records that are either consistent or inconsistent with the previously determined properties of a specific target [Consistent sensor data records can be tentatively associated with the target, while inconsistent sensor data are excluded from data association with the target.]

Rules for handling sensor data records that are deterministically linked to a specific target [Consistent sensor data records are excluded from data association with target A if they are equated to target B. "Equation" is the creation of deterministic data association between a sensor data record and a specific uniquely identified target.]

Rules for handling distinguished measurements [Consistent sensor data records are excluded from target A if they are distinguished from sensor data records that are equated to target A.]

Rules for handling unique sensor data [Unique sensor data records are equated to the specific uniquely identified target to which they correspond.]

Rules that describe the normal and the possible behavior of a target [The sensor data is inconsistent with a specific target if it describes behavior that is impossible for the target to perform, e.g., operating at speeds that are significantly greater than the maximum peak speed of the target.]

Target Knowledge

Knowledge about the properties and capabilities of each target is described by a target technical database. Knowledge about the location and status of each target is described by a target history database. Knowledge about geographic constraints on how targets travel between two locations is described by a set of target-class-dependent obstacle-avoidance databases. Knowledge of the activity or behavioral history of a specific target is described by a target status history database.

Parameters

An observation of a target typically leads to the generation of sensor data containing geographical parameters and target attribute parameters. Geographical parameters may describe the estimated target location, speed, and/or course with measurement error values associated with these estimates at a specific time. Observation of the estimated target bearing and the bearing error with respect to some sensor and the specification of a Time-difference-of-arrival (TDOA) isochrone for a target and the estimated isochrone error (the isochrone swath width corresponding to geometrically amplified TDOA error) are also in the category of geographic measurement data. An isochrone is the locus of points on the surface of the earth whose difference in distance from two sensor locations that detected the emitted energy is constant at an instance of time. A measured TDOA value multiplied by the speed of light equals the difference in distance from the locations of the two sensors.

Emitter attribute parameters, such as center frequency, bandwidth, signal-to-noise ratio, stability, and modulation measurements, characterize and classify the various emitters associated with the target. Several methods have been developed to classify the sensor data records that relate the measured attribute values to type or class of the radar or communication systems that emitted the detected RF energy. A target technical characteristics database can then provide a list of the candidate targets that use the identified radar or communications system.

The data association of the sensor data records with maritime targets provided by ocean surveillance and reconnaissance systems is an example of the class of problems to which at least some of the embodiments described herein are applicable.

At least some of the embodiments disclosed herein involve the utilization of sensor data. The sensor data records may be associated with one or more unique candidate targets. Each candidate target may have attributes that are consistent with the parametric information provided by the sensor data records and has a target status value and target location information that is consistent with the geographic information provided by the sensor data records. The degree of consistency between the sensor data record and the candidate target may be determined by the speed the target must travel to permit it to move from its known location at a given time to the time and location specified by the sensor data record.

Additionally, the multiple-source sensor data records corresponding to difficult-to-detect targets are often asynchronous, i.e., the data records do not provide sufficient temporal or spatial continuity to permit correlation by standard multiple source correlation and tracking algorithms. Standard multiple source correlation and tracking algorithms timeout when the difference in time between consecutive sensor data records exceeds their temporal correlation capabilities. When a multiple-source correlation and tracking algorithm times out, a new target track is created for input sensor data record rather than the correlation of the new input data with an existing target track. The diversity of target attribute values provided by these track fragments does not contribute significantly to target identification. However, if each of the track fragments were linked to a single target, the diversity of target attribute values can contribute substantial target identification information. For this reason, difficult-to-detect targets are also difficult-to-identify targets.

The candidate target selection process described in this invention facilitates the consolidation or linkage of target track fragments and the correlation of asynchronous target data records into multiple-source target tracks. This capability permits the invention to resolve target identification problems for both difficult-to-detect and difficult-to-identify targets. Some sensor data records provide good target identification information but poor quality target location information. Other sensor data records provide minimal target identification information, but they provide high quality target location information. The data association of both types of sensor data records in a multiple-source target track provides high-quality target identification and high-quality target location information.

FIG. 1 shows a block diagram illustrating a system 10 of interfaces between the candidate target selection process 20 and the databases used to determine both an initial set of candidate targets and a final set of candidate targets, as well as the probabilities that each candidate target in the initial set of candidate targets may be associated with input sensor data. The initial set of candidate targets is reduced to the final set of candidate targets by eliminating those initial candidate targets whose data association probabilities with the input sensor data are less than a calculated threshold value.

The sensor data may come from multiple sensors. In some embodiments, the candidate target selection process 20 may incorporate data from one or more of the following databases: the sensor measurement database 30, the target technical characteristics database 40, the target status and geolocation history databases 50, and the algorithm rules database 60. In some embodiments, the candidate target selection process 20 may result in the selection of a set of initial candidate targets based on sensor data being compared to the known attributes of these uniquely identified targets. In some embodiments, the candidate target selection process 20 may result in the selection of a set of final candidate targets whose data association probabilities exceed a calculated threshold value. The threshold value is calculated from a statistical cluster analysis of all the calculated data association probabilities for the initial set of candidate targets.

In some embodiments, the sensor measurement database 30 may contain one or more groups of sensor data records, such as sensor measurement records, sensor report records, and sensor track records. Such sensor data may be obtained by various sensor systems and data correlation and fusion centers that process the information provided by various sensor systems. In some embodiments, the sensor measurement database 30 may also contain information that describes capabilities and limitations of the various sensor systems and data processing centers.

In some embodiments, the target technical characteristics database 40 may contain information on the technical attributes and capabilities of a target, such as, for example, the parametric attributes of signals generated by the various types, classes, and models of the emitters that are used by each specific target. In some embodiments, the target technical characteristics database 40 may contain the target type, class, model, and identification features of each specific target that may be observed by imagery sensors. In some embodiments, the target technical characteristics database 40 may contain information that describes the various physical aspects of the target, such as shape, weight, size (length, width, depth), and hyper-spectral attributes. In some embodiments, the target technical characteristics database 40 may contain information that fully describes and classifies the various subsystems (propulsion, navigation, sensor, communication, command and control, defensive weapons, offensive weapons, air conditioning, life support, fire control, information processing, etc.) of each specific target.

In some embodiments, the target technical characteristics database 40 may contain information that describes the operating characteristics (normal speed, turning radius, acceleration, maximum sustainable speed, maximum peak speed, endurance at maximum peak speed, etc.) of each specific target. In some embodiments, the target technical characteristics database 40 may contain information on the ownership, command authority, country of subordination, names and background of the officers and members of the crew, and any other information that may facilitate target identification and the characterization of each target's activity, intentions, and threat potential.

Target status history and geolocation history databases 50 may contain information on the status history and location history of each target from the time of the target's design to the present time. In some embodiments, the target status history and geolocation history databases 50 may also provide predictions of the target's future status and location. Target status describes the various behavioral modes of a specific target, such as, for example, patrol, transit, certification, crew training, minor repair, major repair or overhaul, construction, decommission or mothball, conversion, salvage, and destruction, etc. As an example, target status at a specific time may be coded as a two-character label, according to design preference. In such embodiments, the first character may be used to describe the target state and the second character may be used to describe the target readiness. Target state for maritime targets may include being in port, being in a local test range, being in a transit region, or being in operational patrol region. As an example, target readiness for a military target may describe the amount of time required before a target may respond to a command to perform its combat mission, such as launching a missile.

In some embodiments, the target status history and geolocation history databases 50 may be used to obtain the target location and status value for each initial candidate target at times that are just before or just after the time of the input sensor data.

In some embodiments, a status history database may comprise records with, for example, four data fields: a unique target identification label, a start time, an end time, and a target status. The status history for a specific target may contain a continuous single thread of information (the start time of the given status record for a specific target is equal to the end time of the preceding status record).

In some embodiments, a target activity history database may be used to perform a more fine-grained analysis of target behavior in the candidate selection process. The target activity history records may contain, for example, at least five data fields: a unique target identification label, a start time, an end time, a target activity code, and a unique command authority identification code. Several target activity history records may overlap at a given moment in time, and there may be other moments of time that are not covered by any target activity record; i.e., the target activity history records may be non-continuous and multiple-threaded. The unique command authority identification code may be used to provide a database link that permits the creation of information that describes the coordinated activity of multiple targets.

In some embodiments, the geolocation history database 50 may provide a time-ordered record of each target's location. The geolocation history data records may be called events and the information in events is derived from equated sensor data records. Event records provide data fields for storing unique target identification labels, specific target type, class, and model labels, the date-time-group value, the inferred target status value, the estimated target location (latitude, longitude, and altitude), and a description of the uncertainty in the target's location.

In some embodiments, the status history database 50 may provide a time-ordered and continuous record of the target status values for each uniquely identified target. The target status values in the status history data records are inferred from equated sensor data records. The generation of status history data records from equated sensor data records is a complex data analysis process. The inferred target status values provided by the equated sensor data records and information obtained from the target technical characteristics database 40 are used in the generation of the status history records for each uniquely identified target. The inference of target status values for an input sensor data record is based on (a) target class, (b) the geographic region where the target is located, and (c) statistical analysis of the status histories for all targets in the same target class. Since the status inference process is target-class dependent, different status values may be estimated for the same sensor data according to the classes of the initial candidate targets.

Target status is a general measure of the target's activity and capabilities during a specified time period. The need for this information by the candidate target selection process 20 arises from the fact that a significant amount of time and intermediate status history intervals may be required for a target to change between two target status values. For example, a target cannot change directly from a major repair status to an operational status. In addition, a target may be required to retain a specific status value for a minimal interval of time before it can transition to another status value. Major repair is an example of a target status value that requires a minimal time interval before the target can change to a different status condition. Major repairs may require several months to complete and they must be finished before the heavy repair status value is changed. At the conclusion of the major repair, the target and its crew must be certified in a series of test trials and training exercises.

Target status transition times and minimal duration intervals are independent of the amount of time required for a specific target to travel from one location to another. Examples of target status values for ships may include, without limitation: (at-sea, patrol), (at-sea, transit), (in-port, light repair), (in-port, heavy repair), (local area, sea trials), and (local area, training). Other types of targets have different target status values.

The completeness and utility of the historical information in the target status and geolocation history databases 50 depends both on (a) the difficulty of equating the sensor measurements to the targets of interest and (b) the amount and diversity of the information provided by the equated sensor data records. In general, increasing the number of sources of information increases the completeness and reliability of the information in the target status and geolocation history databases 50.

With difficult-to-identify targets, the equation of sensor data records to targets may be tentative. Thus, candidate target selection process 20 may invoke frequent revisions of information in the target status and geolocation history databases 50. A natural machine learning process may be implemented and contribute to the effectiveness of candidate target selection and data equation processes.

If the candidate target selection process 20 is successful in generating only a small number of initial candidate targets for a given sensor data record, then the process of equating the sensor data records to a single target is easier and the target status and geolocation history databases 50 becomes more complete and reliable. In turn, the improvement of the information stored in the target status and geolocation history databases 50 permits the candidate target selection process 20 to be more successful in identifying a small number of final candidate targets.

Algorithm rules database 60 may contain rules and metrics for the algorithms used to combine information from the sensor measurement database 30 with information from target technical characteristics database 40 and target status history and geolocation history databases 50 to control candidate target selection process 20. Algorithm rules database 60 may be used for initial candidate target selection as well as for assigning a statistical weight to each initial candidate target based on its maximum calculated speed and the known speed capabilities of each initial candidate target. In some embodiments, algorithm rules database 60 may be used for generating a data association probability for each of the initial candidate targets to the input sensor data and to determine the threshold value that is used to select the final set of candidate targets.

The results from the candidate target selection process may be evaluated and presented in a variety of forms that are suitable for analysis by the receiving party.

In some embodiments, candidate target selection process 20 identifies candidate targets according to the sensor data provided by a set of sensor systems and data processing centers (sensor measurement database 30) on a finite set of targets. The candidate target selection process 20 may match the target identification features provided by the sensor measurement database 30 with the corresponding attributes of the set of targets (target technical characteristics database 40 and status history and geolocation history databases 50).

Figure 2:
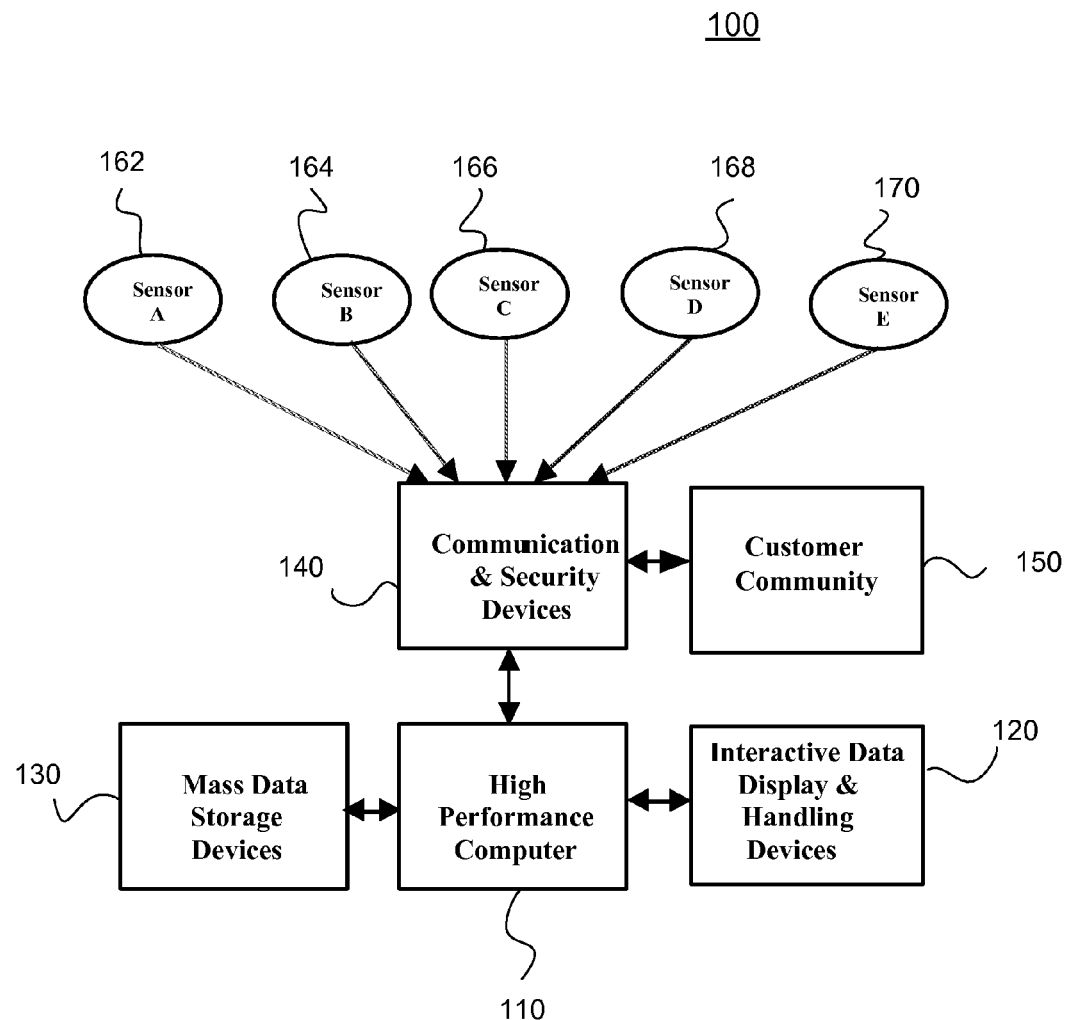
FIG. 2 shows a diagram of one embodiment of a hardware configuration that may be used to implement the candidate target selection process.

FIG. 2 shows a diagram of one embodiment of a hardware configuration 100 that may be used to implement system 10. The components shown in FIG. 2 may comprise commercially available components. Configuration 100 includes a high performance computer 110, interactive data display and handling devices 120, mass data storage devices 130, communication and security devices 140, and sensor systems 162, 164, 166, 168, and 170 that generate digital sensor data on detected targets of interest (not shown). Additionally, customer community information 150 may be coupled to the communication and security devices 140. In some embodiments, customer community information 150 may be housed in another computer system. In some embodiments, an analyst may provide database information and control the candidate target selection process 20.

In one embodiment, target information from sensors 162 through 170 is forwarded to communication and security devices 140, which may forward the information via a secure channel to high performance computer 110. Sensors 162 though 170 may comprise various sensors including, but not limited to: magnetometers, LADAR (Laser Radar), LIDAR (Light Detection and Ranging), pan/tilt video cameras, antenna identification systems, ACINT (acoustic intelligence) collection systems, national and tactical COMINT (communication intelligence) collection systems, national and tactical ELINT (electronic intelligence) collection systems, other national and tactical SIGINT (signal intelligence) collection systems, national and tactical IMINT (imagery intelligence) systems, HUMINT (human intelligence) agents and information collection processes, OSINT (open source intelligence) information collection methods, a wide variety of MASINT (measurement and signals intelligence) collection systems, the Automatic Identification System (AIS) used by maritime targets, GPS, millimeter wave RADAR (Radio Detection and Ranging), RADAR, monocular vision cameras, stereo vision cameras, SONAR (sound navigation and ranging), gyroscopes, compasses, and accelerometers.

Customer community information 150 may provide human judgment and interpretation information to the candidate target selection process by using communication and security devices 140. The information may be stored on the mass data storage devices 130. Interactive data display & handling devices 120 may be used to distribute and display the "processed" information from a high performance computer 110 to users of the system.

Figure 3:
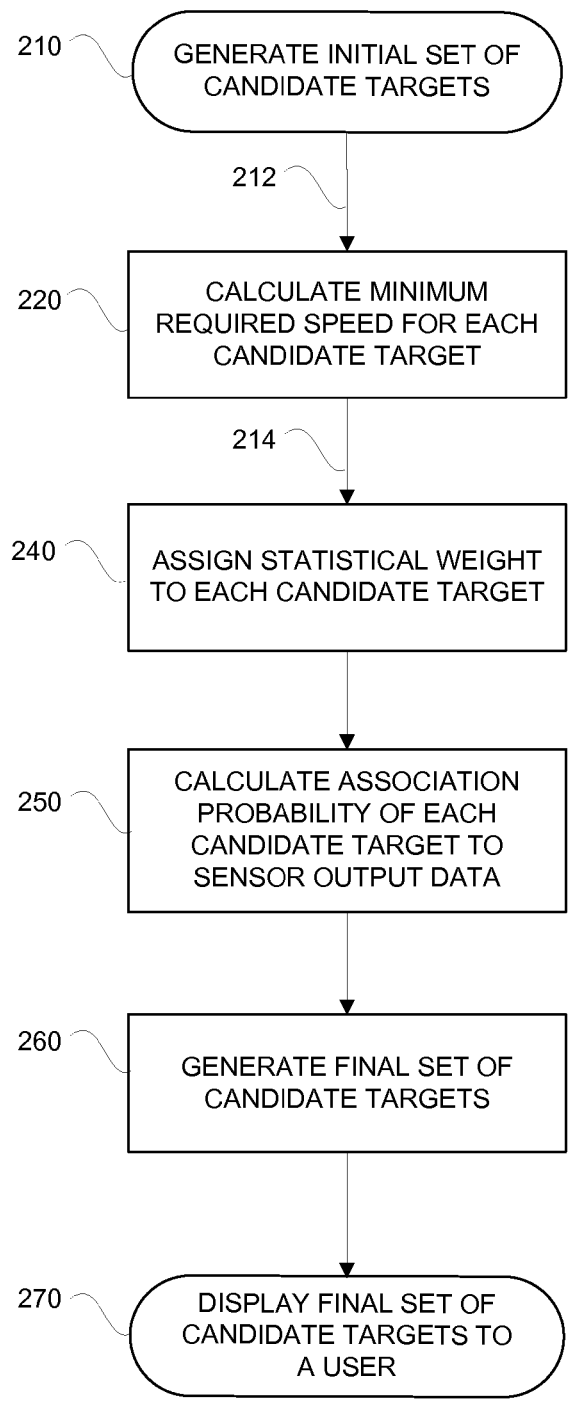
FIG. 3 shows a flow chart of one embodiment of a method for the candidate target selection process

FIG. 3 shows a flow chart of a method 200 involving one embodiment of candidate target selection process 20. Method 200 may include steps 210, 220, 240, 250, 260, and 270. Step 210 involves generating an initial set of candidate targets from the comparison of the classified sensor data with the known attributes of uniquely identified targets. The initial set of candidate targets may include one or more candidate targets. Each initial candidate target has known performance capabilities that influence the selection of the final set of candidate targets. The maximum sustainable speed and the maximum peak speed capabilities of the initial candidate targets are used by a simple data consistency test to determine the statistical weight assigned to each of the initial candidate targets in step 240. Other target capabilities could also be used in a more sophisticated data consistency test. Step 210 may involve the use of information obtained from the target technical characteristics database 40 and procedures provided by the algorithm rules database 60 to evaluate the information obtained from target technical characteristics database 40.

Step 210 may involve a set of well-defined procedures obtained from algorithm rules database 60 that enable the input sensor data provided by the sensor measurement database 30 to be converted into target classification and identification features. The target classification and identification features calculated from the input sensor data are then matched using rules provided by algorithm rules database 60 with the target classification and identification information provided by a target technical database 40 for a finite set of uniquely identified targets to generate the initial set of candidate targets. Naval Order of Battle (NOB) information provides an example of a finite set of uniquely identified targets.

In general, the sensor data-to-target data association process is complex and may involve multiple steps. The first step is the classification of sensor data by emitter type and model. The next step is to select the uniquely identified targets that use the identified emitter type and model. The selected targets become the initial set of candidate targets for input sensor data in step 210.

For example, analysis of the acoustic signals emitted by a bottom transponder that generated the energy detected by a sensor(s) may identify a type of transponder used by a specific class of oceanographic research ships. If there are multiple deployed ships that use that type of bottom transponder, then additional information, as further discussed below, is needed to determine the "specific" ship that is detected. In some instances, it is possible that an anomaly observed in the signal generated by the transponder might permit the unique identification of the oceanographic ship.

Figure 4:
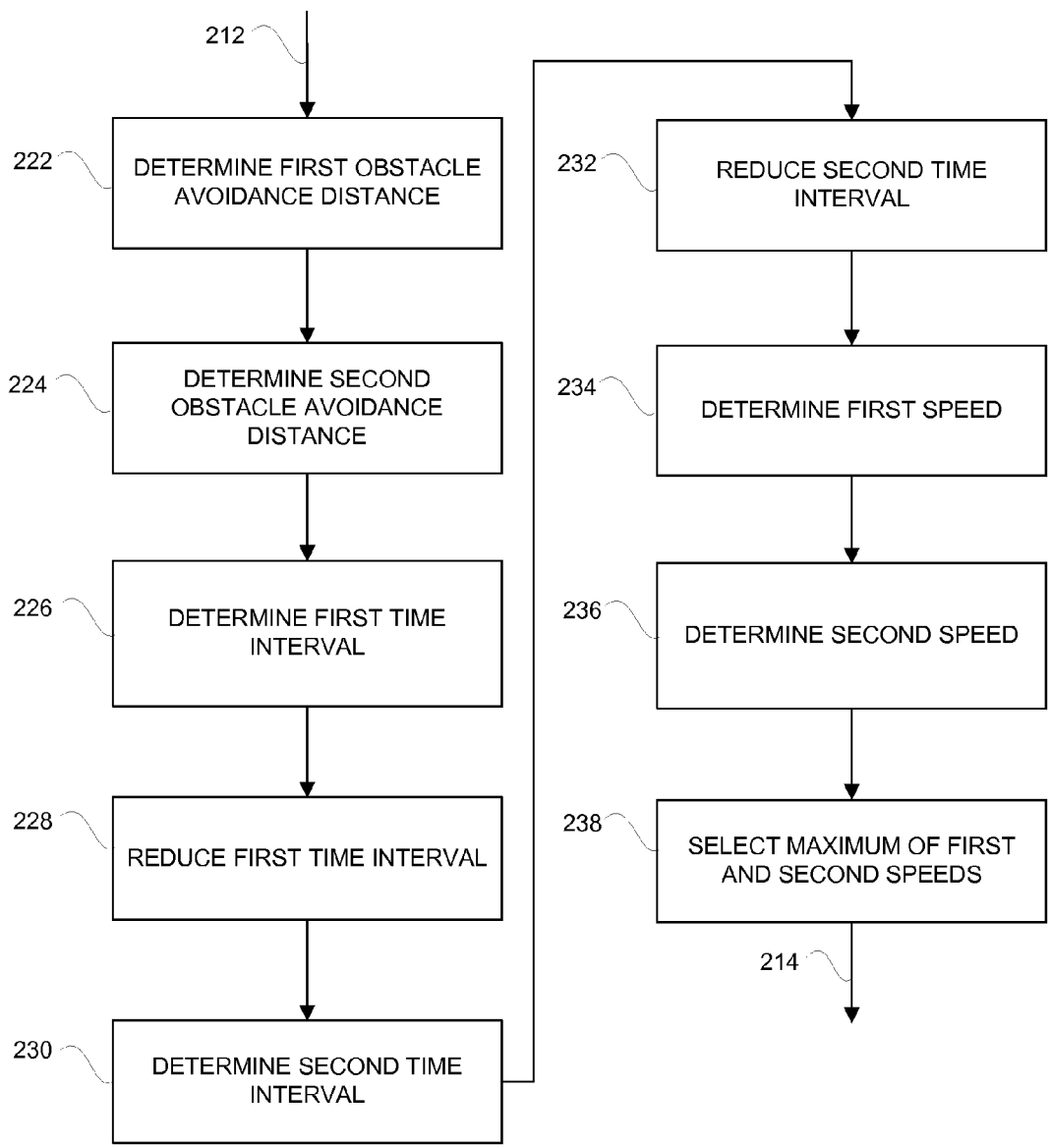
FIG. 4 shows a flow chart of one embodiment of the step for calculating the minimum speed for a candidate target that is subject to both obstacle avoidance and target status transition time constraints.

Following step 210, method 200 may proceed along flow path 212 to step 220. Step 220 involves calculating the minimum required speed for a candidate target that is subject to both obstacle avoidance and target status transition time constraints. One embodiment of step 220 is shown in FIG. 4. As shown in FIG. 4, step 220 may include steps 222, 224, 226, 228, 230, 232, 234, 236, and 238.

Step 222 may involve determining a first obstacle avoidance distance. The first obstacle avoidance distance may be the distance between a location specified by the sensor data and the location for the candidate target obtained from the geolocation history database at a time value just before a time value of the sensor data. Method 200 may then proceed to step 224, which may involve determining a second obstacle avoidance distance. The second obstacle avoidance distance may be the distance between the location specified by the sensor data and the location of the candidate target obtained from the geolocation history database at a time value just after the time value of the sensor data.

Step 226 may follow step 224. Step 226 may involve determining a first time interval, wherein the first time interval is the difference between the time value of the sensor data and the time value of the candidate target's location that is just before the time value of the sensor data. Step 228 may involve reducing the duration of first time interval by the amount of time required for the candidate target to change from its status from its status history value just before the time value of the sensor data to the target status inferred for the sensor data. Following step 228, step 230 may involve determining a second time interval. The second time interval may be the difference between the time value of the candidate target's location that is just after the time value of the sensor data and the time value of the sensor data Method 200 may then proceed to step 232, which may involve reducing the duration of the second time interval by the amount of time required for the candidate target to change from the target status value inferred for the sensor data to its status history value just after the time value of the sensor data. Following step 232, step 234 may involve determining a first speed by dividing the first obstacle avoidance distance by the first reduced time interval. Step 236 may then involve determining a second speed by dividing the second obstacle avoidance distance by the second reduced time interval. Method 200 may then proceed to step 238, which may involve selecting the maximum of the first speed and the second speed. The maximum of the two speeds is the minimal speed with which the candidate target may travel between its geolocation history locations and the location provided by the sensor data that is subject to both obstacle avoidance and status transition time constraints. Method 200 may then proceed to step 240 along flow path 214.

Referring back to FIG. 3, step 240 involves assigning a statistical weight to each candidate target based upon the maximum calculated speed and the speed capability of each candidate target. Step 240 may involve the use of information provided by target status and geolocation history databases 50 and obstacle-avoidance data (not shown) and procedures obtained from algorithm rules database 60 to calculate the maximum speed required for each initial candidate target.

Step 220 may involve maintenance of the target status and geolocation history databases 50 that provide the candidate target's locations just before and just after the time of the target location specified by or determined from the input sensor data. In addition, if the class of the candidate target is subject to obstacle-avoidance constraints, knowledge of the minimal-length obstacle-avoidance path between two points on the surface of the earth may be used. Obstacle-avoidance information is target class dependent since certain routes are not possible for all sizes and types of targets; e.g., super tankers are too large for the Suez Canal.

The target location and status information just before and just after the time of the sensor data may be obtained for each candidate target from target status and geolocation history databases 50. A target speed is calculated for each candidate target from its known location just before the time of the sensor data to the location provided by the sensor data record. A target speed may also be calculated from the sensor data location to the target's known location just after the time of the sensor data record. In most instances, the collection times of the sensor data will be later than the most recent information on a target in the target status and geolocation history databases 50. For those cases, only one speed value is calculated. However, some sensor systems provide data that is very time-late due to issues involving the delay in the transmission of the sensor data to the data processing system performing the candidate target selection procedure.

The speed calculations include consideration of target-class-dependent obstacle-avoidance constraints, the uncertainty in the knowledge of the candidate target's location, and the uncertainty in the geolocation information provided by the sensor data. If the status inferred for the input sensor data is different from the status of a candidate target before or after input sensor data, the time required for the target to change status may be considered in the target speed calculation. In the case of maritime targets, obstacle-avoidance constraints are typically denoted as land-avoidance constraints that restrict the movement of maritime targets over landmasses. Mountains, lakes, and other natural and man-made obstacles restrict the movement of some terrestrial targets between two points on the surface of the earth. Weather conditions may also restrict the movement of maritime, terrestrial, and aircraft targets.

With most moving targets, there is a certain degree of target location uncertainty for any given sensor data record. Descriptions of target location uncertainty include: the circular radius of uncertainty; the inclination, semi-major axis, and semi-minor axis of an error ellipse; the inclination, length, and half-width of a bearing box; the bearing confidence sector for a line-of-bearing measurement; and general polygonal regions, e.g., the Northeast Atlantic.

Different calculations may be required to accurately reflect these different types of target location uncertainty in determining the speed required for a target to travel from one location to another. These calculations involve spherical trigonometry and are known by one having ordinary skill in the art.

Figure 5:
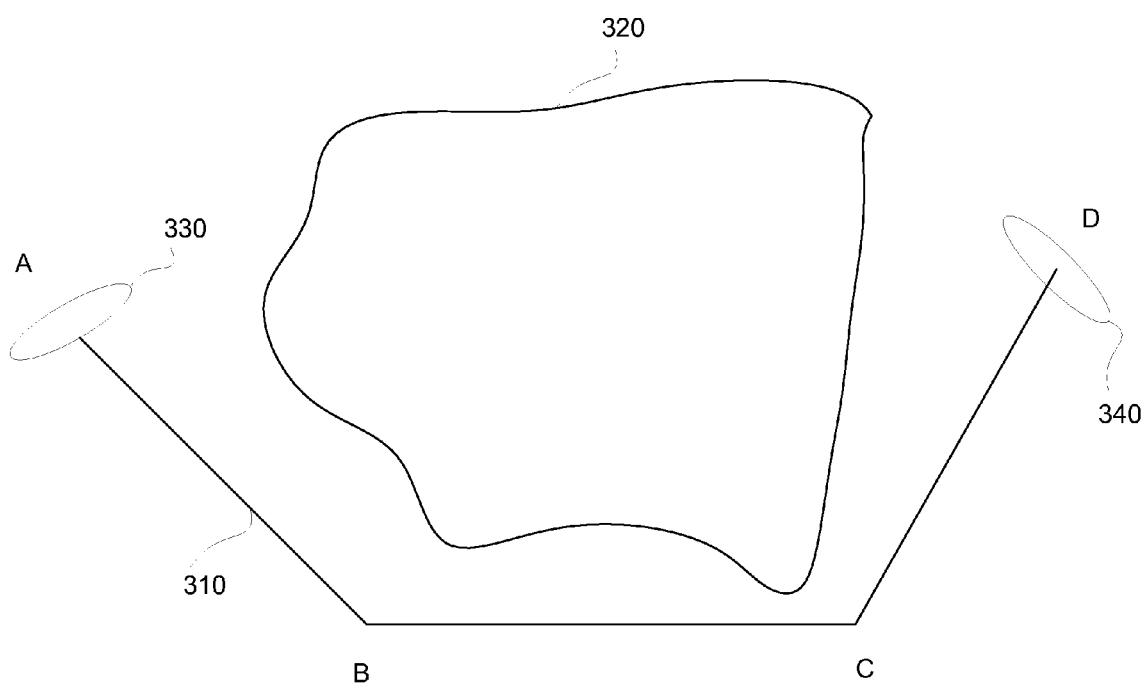
FIG. 5 shows a diagram illustrating an obstacle-avoidance path between two target locations and the location uncertainty areas corresponding to the two target locations.

FIG. 5 shows a diagram 300 demonstrating an example of location uncertainty issues for a path 310 traversed by a target around a landmass 320. In this example, the calculation of the distance between estimated target locations A and D is affected by the two error ellipses 330 and 340 and by obstacle-avoidance constraints 310. The error ellipse 330 around point A shows the uncertainty in the knowledge of the target's actual location at the time the location of the target was estimated. The error ellipse 340 surrounding point D shows the location uncertainty in a sensor data. The path A→B→C→D avoids the traversal of the landmass 320 between points A and D. The obstacle-avoidance distance $d_{la}$ between points A and D is equal to the sum of the great-circle arcs $d_{gc}$ connecting each of the points along the path:

$$d_{la}(A,D) = d_{gc}(A,B) + d_{gc}(B,C) + d_{gc}(C,D) \tag{1}$$

The minimum distance $d_{min}$ between points A and D subject to obstacle-avoidance constraints is equal to the obstacle-avoidance distance $d_{la}$ minus the distance from the center of the error ellipse 330 to the edge of the error ellipse 330 in the direction of the vector from point A at the center of the error ellipse to point B along the obstacle-avoidance path 310 and minus the distance from the center of error ellipse 340 in the direction of the vector from point D to point C along the obstacle-avoidance path 310:

$$d_{min}(A,D)=d_{la}(A,D)-u_{L_A}(A)-u_{L_D}(D) \qquad (2)$$

Figure 6:
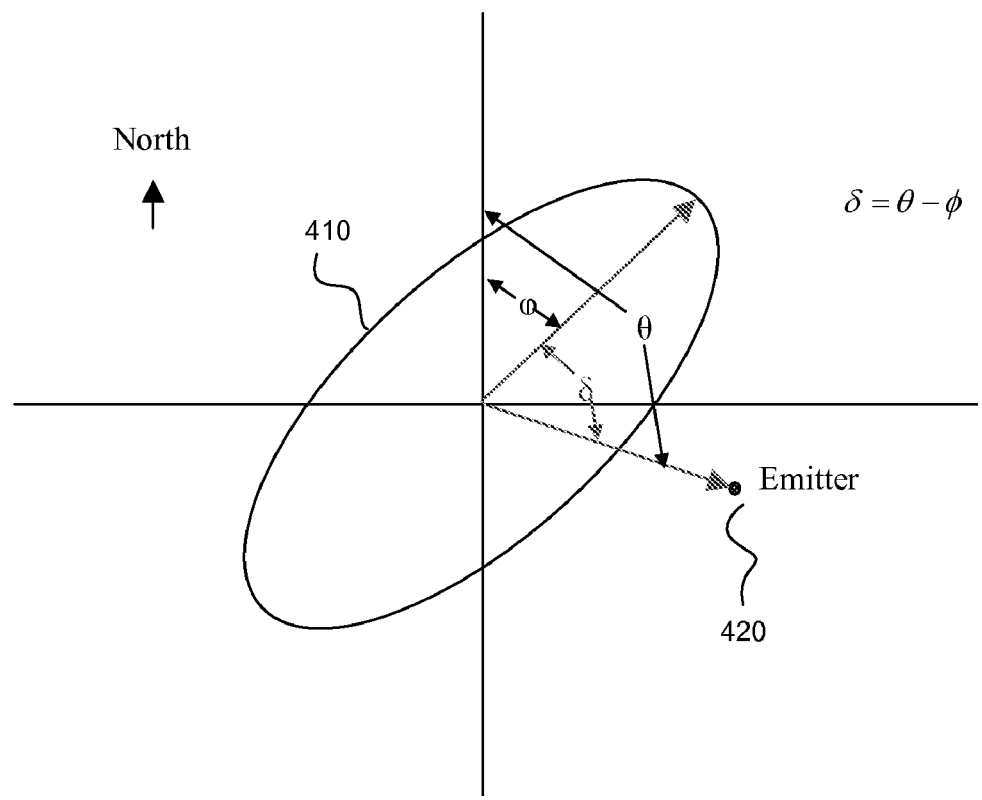
FIG. 6 shows a diagram of an error ellipse.

The distances $u_{L_A}$ and $u_{L_d}(D)$ reflect the uncertainties in the target location estimates of points A and D. These uncertainties are a function of the error ellipse parameters 410 shown in FIG. 6. For the error ellipse 410, the uncertainty distance is equal to the ellipse containment distance used to evaluate whether the error ellipse 410 actually contains the true location of an emitter on the target 420. If $a_i$ is the semi-major axis of the $i^{th}$ error ellipse, $b_i$ is the semi-minor axis, and $\delta_i$ is the clockwise angle between the vector pointing along the semi-major axis and the vector from the center of the ellipse to the emitter location, then the containment distance may be shown to be equal to:

$$\rho_i = \frac{a_i b_i}{\sqrt{a_i^2 \sin^2 \delta_i + b_i^2 \cos^2 \delta_i}}. \qquad (3)$$

In general, the equations for calculating the uncertainty distances $u_{L_A}(A)$ and $u_{L_D}(D)$ depend on the types of the geographic uncertainty areas $L_A$ and $L_D$ associated with the points A and D. Elliptical uncertainty areas are the most common, but circles, bearing boxes, bearing wedges, and polygons may also be used to describe the uncertainty in the location of a target.

Obstacle-avoidance constraints and information is stored in an obstacle-avoidance database that may be contained in a separate database or as part of the algorithm rules database 60. There are at least two approaches to the incorporation of obstacle-avoidance constraints in the calculation of the speed of advance for a ship. In one approach, a great-circle arc is constructed between the two locations of interest. A hidden-line algorithm is then used to determine whether this great-circle arc intersects any polygonal figure representing a landmass. If an intersection is found, a calculation is made to determine the two nodes in an obstacle-avoidance network that are closest to the two points. The network is then solved to find the shortest distance between the two nodes. Straightforward solution of this network problem is understood to require computational time that increases as $O(n^3)$ where n is the number of nodes in the network. (See, for example, "Floyd-Warshall algorithm", *Dictionary of Algorithms and Data Structures*, Paul E. Black, NIST.)

The obstacle-avoidance algorithm may be implemented using an obstacle-avoidance algorithm such as, for example, the "Floyd-Warshall" algorithm or other applicable algorithms. (See "A spatial model of maritime activities and risks," by Ronald P. Pelot, Ph.D., P. Eng. Department of Industrial Engineering, Dalhousie University, Halifax, MAYADA.) As this disclosure is not dependent on any specific obstacle-avoidance algorithm, other obstacle-avoidance algorithm methods may be used, including ones that do not solve the problem by finding the shortest distance between two points on a network of nodal points. The alternative obstacle-avoidance algorithms may not require a detailed coastline database.

Speed calculation may be based on several factors. For example, let $T_1$, $P_1$, $L_1$, and $S_1$ represent the time, position, location uncertainty, and status, respectively, of a candidate target provided by the target status and geolocation history databases 50 just prior to the time of the sensor data. Let T, P, L, and S represent the time, position, location uncertainty, and inferred status, respectively, provided by the sensor data. Let $T_2$, $P_2$, $L_2$, and $S_2$ represent the time, position, location uncertainty, and status, respectively, for the candidate target provided by the target status and geolocation history databases 14 just after the time of the sensor data.

The speed-of-advance from point $P_1$ to point P is estimated as:

$$s_1 = \frac{d_1^{min}(P_1, P)}{\Delta t_1} \text{ where} \qquad (4)$$

$$d_1^{min}=\max[0, d_{la}(P_1,P)-u_{L_1}(P_1)-u_L(P)] \text{ and} \qquad (5)$$

$$\Delta t_1 = \max[1, T-T_1-c(S_1,S)]. \qquad (6)$$

The function $c(S_1,S)$ provides an estimate of the minimum amount of time required for the candidate target to change status from $S_1$ to S and also includes consideration of the minimum amount of time that the candidate target must stay in status $S_1$ before it can transition to another status value, and the max functions in equations 5 and 6 are used to ensure that equation 4 provides reasonable estimates of candidate target speed under abnormal conditions.

Similarly, the speed-of-advance from point P to point $P_2$ is estimated as:

$$s_2 = \frac{d_2^{min}(P, P_2)}{\Delta t_2} \text{ where} \qquad (7)$$

$$d_2^{min}=\max[0, d_{la}(P,P_2)-u_L(P)-_{L_2}(P_2)] \text{ and} \qquad (8)$$

$$\Delta t_2 = \max[1, T_2-T-c(S,S_2)]. \qquad (9)$$

The function $c(S_a, S_b)$ is non-symmetrical. For example, the time required to change status from "in-port, heavy repair" to status "at-sea, operational" is not the same as the time required to change from "at-sea, operational" to "in-port, heavy repair". The first change normally requires the completion of the heavy repair and a period of trials and training. The function $c(S_a, S_b)$ is also target-class dependent.

Step 250 involves calculating data association probabilities for each initial candidate target that are based on the statistical weights assigned to the candidate target in step 240. Step 240 may utilize the estimated target speeds and information provided by the target technical characteristics database 40, as well as the procedures obtained from algorithm rules database 60, to assign weights to the initial set of candidate target(s).

Once target speeds have been determined for each of the initial candidate targets, the problem of estimating the statistical weight assigned to a candidate target depends on the model used to represent the behavior of the target class to which the candidate target belongs. The following set of equations corresponds to a simple model that considers two speed values for a candidate target $S_{max-sustainable}$ and $S_{max-peak}$ and the endurance time $T_j$ of $j^{th}$ candidate target at the maximum peak speed. The following equations may be used to calculate a weight for each candidate target for input sensor data. Sensor data association probabilities are calculated from the ratio of the weight determined for a particular candidate target to the combined weight for the entire set of initial candidate targets.

The equations used to determine the weights and data association probabilities are heuristic. These equations depend on how well the behavior of the candidate targets is modeled for a particular class of targets. The model that will be described below may work for some target classes, but different models may be required for other classes of targets. The heuristic target behavior model for a given target class needs to be tuned to ensure that the calculated weights clearly discriminate between targets that are consistent with input sensor data and targets that are inconsistent with the input sensor data. The different heuristic target class models permit the exemplary methods described herein to be applied to many different problems in which input sensor data is associated with the initial candidate targets.

Let $s_j = \max[s_1, s_2]$ for the $j^{th}$ candidate target if both speed values are calculated. Otherwise, let $s_j$ be equal to $s_1$ or $s_2$ if either value is calculated or let the weight $w_j = w_3$ be assigned to the $j^{th}$ candidate target, if no speed value is calculated. (If no speed value is calculated for the $j^{th}$ candidate target, the target status and geolocation history databases 50 contain no information for this target.)

Assign $\Delta t_j$ to equal either $\Delta t_1$ or $\Delta t_2$, depending on which speed value is selected for $s_j$.

If $s_j \leq S_{max-sustainable}$, the weight assigned to the $j^{th}$ candidate target is $$w_j = w_1. \tag{10}$$

If $S_{max-sustainable} < s_j \leq S_{max-peak}$, the weight assigned to the $j^{th}$ candidate target is $$w_j = w_1 \left[ \frac{S_{max-peak} - s_j}{S_{max-peak} - S_{max-sustainable}} \right] + w_2 \left[ \frac{s_j - S_{max-sustainable}}{S_{max-peak} - S_{max-sustainable}} \right] \exp\left(-\frac{\Delta t_j}{T_j}\right). \tag{11}$$

If $s > S_{max-peak}$, the weight assigned to the $j^{th}$ candidate target is $$w_j = w_2 \exp\left(-\frac{\beta \Delta t_j}{T_j}\right) \text{ where } \beta \text{ is a turning parameter.} \tag{12}$$

The following relationship exists about the three weights:

$$w_1 > w_2 > w_3. \tag{13}$$

The weight for the $j^{th}$ candidate target that is determined by these equations transitions from the value $w_1$ when the speed of the target is less than or equal to $S_{max-sustainable}$ to a value less than $w_2$ when the target has a speed greater than $S_{max-peak}$. The weight for the $j^{th}$ candidate target also decays exponentially as its speed approaches $S_{max-peak}$ for a time period that is scaled by the target's endurance time at its maximum speed. The weight $w_3$ assigned to a new target permits the new target to also be considered as a candidate for a sensor data record with low probability. If the new candidate target is the only target that matches the input sensor data with significant weight, the sensor data may be equated to the new candidate target.

The total weight of m initial candidate targets may be calculated by:

$$w_T = \sum_{j=1}^{m} w_j. \tag{14}$$

The data association probability for the $j^{th}$ candidate target may be estimated by $$p_j = \frac{w_j}{w_T}. \tag{15}$$

Step 260 involves generating a final set of candidate targets based upon the calculated data association probabilities for each candidate target. The final candidate target generation of step 260 may use statistical cluster analysis to evaluate the calculated data association probabilities for the set of initial candidate targets and determine a threshold value. Step 260 may be accomplished by selecting as the final candidates those initial candidate targets whose data association probabilities exceed the calculated threshold value.

In some embodiments, step 270 may involve storing the unique target identification labels and the corresponding sensor data association probabilities in a database table, for example, a "Sensor Data-to-Unique Target Data Association" table in the sensor measurement database 30. The "Sensor Data-to-Unique Target Data association" table may comprise four data fields: a date-time-group for the candidate target selection process 20; a unique identification label for the input sensor data; a unique identification label for a final candidate target; and a data association probability. The number of records stored in the "Sensor Data-to-Unique Target Data association" table is equal to the number of final candidate targets generated by the candidate target selection process 20.

Method 200 may include step 270, wherein the final set of candidate targets are displayed to a user. As an example, the final set of candidate targets may be displayed on a commercially available display device.

Method 200 may be implemented using a programmable device, such as a computer-based system. Method 200 may be implemented using any of various known or later developed programming languages, such as "Java", "Perl", "SQL", "C", "C++", "FORTRAN", Pascal", and "VHDL".

Various computer-readable storage mediums, such as magnetic computer disks, optical disks, and electronic memories, may be prepared that may contain instructions such that they direct a device, such as a computer-based system. They may implement the steps of method 200. Once an appropriate device has access to the instructions contained on the computer-readable storage medium, the computer-readable storage medium may provide the information and programs to the device, enabling the device to perform method 200.

As an example, if a computer disk containing appropriate materials, such as a source file, an object file, or an executable file, were provided to a computer, the computer could receive the information, appropriately configure itself and perform the steps of method 200. The computer could receive various portions of information from the disk relating to different steps of method 200, implement the individual steps, and coordinate the functions of the individual steps.

Method 200 may also be implemented by a system having a display, a processor operatively connected to the display, and a memory module operatively connected to the processor. The memory module may have program instructions stored therein, wherein the program instructions are executable by the processor to perform method 200. Method 200 may result in a final set of candidate targets being displayed to a user of the system via the display device.

EXAMPLE

The example uses arbitrary information to calculate data associated probabilities. Table 1 provides arbitrary values for the constant parameters described in equations 10 through 15, while table 2 applies these arbitrary parameters to a set of random speed and time values determined for twenty-five targets to provide a concrete illustration for ideas expressed by equations 10 through 15.

TABLE 1

Arbitrary Speed, Endurance Time, and Speed Values

| Name | Value | Units | Description |
|---|---|---|---|
| mss | 10 | knots | Maximum sustainable speed |
| msp | 20 | knots | Maximum peak speed |
| te | 5 | hours | Endurance time at peak speed |
| wt1 | 10 | n/a | Weight-1 |
| wt2 | 5 | n/a | Weight-2 |
| wt3 | 3 | n/a | Weight-3 |

TABLE 2

Sensor Data association Probabilities for Twenty-five Candidate Targets

| Initial Candidate | Candidate Speed | Candidate Time | Weight | Assoc. Prob. | Final Candidate |
|---|---|---|---|---|---|
| 1 | 4.5 | 15.0 | 10.000 | 14.2 | 1 |
| 2 | 41.1 | 16.8 | 0.000 | 0.0 | |
| 3 | 27.2 | 1.7 | 0.295 | 0.4 | |
| 4 | 39.0 | 17.7 | 0.000 | 0.0 | |
| 5 | 24.2 | 0.7 | 1.788 | 2.5 | |
| 6 | 18.1 | 0.2 | 5.776 | 8.2 | 6 |
| 7 | 18.1 | 17.3 | 1.998 | 2.8 | |
| 8 | 3.6 | 11.8 | 10.000 | 14.2 | 8 |
| 9 | 5.9 | 18.6 | 10.000 | 14.2 | 9 |
| 10 | 21.6 | 3.1 | 0.011 | 0.0 | |
| 11 | 24.2 | 15.5 | 0.000 | 0.0 | |
| 12 | 9.4 | 2.5 | 10.000 | 14.2 | 12 |
| 13 | 28.2 | 4.3 | 0.002 | 0.0 | |
| 14 | 18.0 | 2.2 | 4.557 | 6.5 | 14 |
| 15 | 19.6 | 7.8 | 1.406 | 2.0 | |
| 16 | 34.4 | 11.0 | 0.000 | 0.0 | |
| 17 | 45.7 | 4.8 | 0.001 | 0.0 | |
| 18 | 32.9 | 9.5 | 0.000 | 0.0 | |
| 19 | 32.1 | 14.6 | 0.000 | 0.0 | |
| 20 | 47.4 | 9.7 | 0.000 | 0.0 | |
| 21 | 7.8 | 17.1 | 10.000 | 14.2 | 21 |
| 22 | 21.6 | 15.5 | 0.000 | 0.0 | |
| 23 | 19.4 | 10.0 | 1.247 | 1.8 | |
| 24 | 19.2 | 4.2 | 2.794 | 4.0 | |
| 25 | 35.0 | 1.7 | 0.420 | 0.6 | |
| | | Total | 70.298 | 100.0 | |

The twenty-five candidate speed values were generated by multiplying the Excel random number generator function rand( ) by 50. The twenty-five candidate time values were generated by 20*rand( ). The actual weights and speed values used by the disclosed invention will depend on the specific candidate target selection process the invention is used to solve. The disclosed candidate target selection procedure may be applied to resolve multiple-source data fusion issues for many different types of targets.

As shown in Tables 1 and 2, there are five candidate targets with which the input sensor data may be associated with an estimated probability of 14.2% since the calculated speeds for each of these targets is less than the maximum sustainable speed at which these candidate targets operate. There are two additional candidate targets with which the input sensor data may be associated with probabilities of 6.5% and 8.2%. The input measurement data have data association probabilities with the remaining seventeen initial candidate targets that are less than an arbitrary threshold value of 5.0%. The seven candidate targets whose calculated data association probabilities are greater than or equal to five percent are selected to be in the list of final candidate targets.

Many modifications and variations of the System and Method for Classification of Multiple Source Sensor Measurements, Reports, or Target Tracks and Association of with Uniquely Identified Candidate Targets are possible in light of the above description. As an example, the combined information content of a set of sensor data records that are deterministically linked to a single target track may be used to determine the data association probability of the track with each uniquely identified candidate target. Further, the most restrictive constraint on the location and behavior of each candidate target may be used to calculate the data association probability for the target track.

Therefore, within the scope of the appended claims, the System and Method for Classification of Multiple Source Sensor Measurements, Reports, or Target Tracks and Association with Uniquely Identified Candidate Targets may be practiced otherwise than as specifically described. Further, the scope of the claims is not limited to the implementations and embodiments disclosed herein, but extends to other implementations and embodiments as may be contemplated by those having ordinary skill in the art.

What is claimed is:

1. A computer readable storage medium having a method encoded thereon, the method represented by computer readable programming code, executed by a computer to perform the method comprising the steps of:
   classifying input sensor data by comparing one or more measured target attributes with one or more known attributes of a finite set of uniquely identified targets;
   generating an initial set of one or more candidate targets based upon a comparison of the classified input sensor data with the known attributes of the finite set of uniquely identified targets;
   calculating a minimum required speed for each candidate target to travel between a geolocation history location and a location provided by the input sensor data, the minimum required speed subject to both obstacle avoidance and status transition time constraints;
   assigning a statistical weight to each candidate target based upon its calculated minimum required speed;
   calculating a data association probability of each candidate target with the classified input sensor data; and
   generating a final set of candidate targets by selecting the candidate targets from the initial set of candidate targets having calculated data association probabilities that exceed a predetermined threshold value.

2. The computer readable storage medium of claim 1, wherein the step of generating an initial set of one or more candidate targets includes selecting, from the finite set of uniquely identified targets, a subset of uniquely identified targets having attributes consistent with the classified input sensor data.

3. The computer readable storage medium of claim 1, wherein the step of calculating the minimum required speed for each candidate target includes the steps of:
   determining a first obstacle avoidance distance, wherein the first obstacle avoidance distance is the distance between a location specified by the input sensor data and a known location of the candidate target at a time value just before a time value of the input sensor data;
   determining a second obstacle avoidance distance, wherein the second obstacle avoidance distance is the distance between the location specified by the input sensor data and a known location of the candidate target at a time value just after the time value of the input sensor data;
   determining a first time interval, wherein the first time interval is the difference between the time value of the input sensor data and the time value of the candidate target's location just before the time value of the input sensor data;

reducing the first time interval by the amount of time required for the candidate target to change from its status history value just before the time value of the sensor data to the target status inferred for the sensor data;

determining a second time interval, wherein the second time interval is the difference between the time value of the candidate target's location that is just after the time value of the sensor data and the time value of the sensor data;

reducing the second time interval by the amount of time required for the candidate target to change from the target status inferred for the sensor data to its status history value just after the time value of the sensor data;

determining a first speed by dividing the first obstacle avoidance distance by the first reduced time interval;

determining a second speed by dividing the second obstacle avoidance distance by the second reduced time interval; and selecting the maximum of the first speed and the second speed as the minimal required speed.

4. The computer readable storage medium of claim 3, wherein the first time interval and the second time interval are shortened using minimum status interval duration statistics and minimum status transition time statistics that are determined from the comparison of a target status history value of the known location of the candidate target at a time value just before a time value of the sensor data and an inferred target status value of the sensor data and a target status history value of the known location of the candidate target at a time value just after a time value of the sensor data and the inferred target status value of the sensor data.

5. The computer readable storage medium of claim 4, wherein the inferred target status value is inferred from the input sensor data using a target class of the candidate target, a geographic region wherein the candidate target is located, and statistical analysis of status histories of candidate targets in the same target class as the candidate target.

6. The computer readable storage medium of claim 1, wherein the step of assigning a statistical weight to each candidate target includes a heuristic comparison of the calculated minimum required speed for each candidate target that is subject to both obstacle avoidance and status transition time constraints with maximum speed capabilities of each candidate target.

7. The computer readable storage medium of claim 1, wherein the calculation of a data association probability for each candidate target to the input sensor data is based upon a ratio of weight determined for the particular candidate target to the combined weight of the initial set of candidate targets.

8. The computer readable storage medium of claim 1, wherein the step of generating a final set of candidate targets includes selecting one or more candidate targets from the set of initial candidate targets wherein the data association probability for each selected candidate target exceeds a threshold value calculated from statistical cluster analysis of the calculated data association probabilities for all of the initial candidate targets.

9. The computer readable storage medium of claim 1, wherein a weight $w_j$ for a $j^{th}$ candidate target is based upon a minimal required speed $s_j = \max[s_1, s_2]$, where $s_1$ is the speed-of-advance for the candidate target to travel from a point $P_1$ to a point P that is subject to both obstacle avoidance and status transition time constraints, where point $P_1$ is the "just before target history location" for the $j^{th}$ candidate target and where point P is a target location provided by the sensor data, and $s_2$ is the speed-of-advance for the candidate target to travel from the point P to a point $P_2$ that is subject to both obstacle avoidance and status transition time constraints, where point $P_2$ is the "just after target location" for the $j^{th}$ candidate target.

10. The computer readable storage medium of claim 9, wherein if $s_j \leq s_{max\text{-}sustainable}$, where $s_{max\text{-}sustainable}$ is a maximum speed of the $j^{th}$ candidate target that can be sustained over an indefinite period of time, then $w_j = w_1$.

11. The computer readable storage medium of claim 9, wherein if $s_{max\text{-}sustainable} < s_j < s_{max\text{-}peak}$, then $$w_j = w_1 \left[ \frac{s_{max\text{-}peak} - s_j}{s_{max\text{-}peak} - s_{max\text{-}sustainable}} \right] + \quad (11)$$

$$w_2 \left[ \frac{s_j - s_{max\text{-}sustainable}}{s_{max\text{-}peak} - s_{max\text{-}sustainable}} \right] \exp\left(-\frac{\Delta t_j}{T_j}\right).$$

where $w_1 > w_2$, where $T_j$ is the peak speed endurance time of the $j^{th}$ candidate target, where $s_{max\text{-}peak}$ is the maximum peak speed of the $j^{th}$ candidate target, and where $\Delta t_j$ corresponds to the target status transition adjusted time intervals used to calculate the maximum speed for the $j^{th}$ candidate target.

12. The computer readable storage medium of claim 11, wherein time difference $\Delta t_1$ is calculated according to $\Delta t_1 = \max[1, T - T_1 - c(S_1, S)]$, where T represents the time provided by the sensor data, $T_1$ is the time of the "just before location" for the $j^{th}$ initial candidate target, and the status transition time function $c(S_1, S)$ is the minimum time required for the $j^{th}$ initial candidate target to transition from its historical target status $S_1$ to the target status S inferred from the sensor data, and where $\Delta t_2$ is calculated by $\Delta t_2 = \max[1, T_2 - T - c(S, S_2)]$, where T represents the time provided by the sensor data, $T_2$ is the time corresponding to "just after location" of the $j^{th}$ initial candidate target, and $c(S, S_2)$ is the minimum time required for the initial candidate target to transition from the target status S inferred from the sensor data to the historical target status $S_2$ of the $j^{th}$ initial candidate at time $T_2$.

13. The computer readable storage medium of claim 12, wherein the status transition time function is both target-class-dependent and non-symmetric.

14. The computer readable storage medium of claim 9, wherein if $s_j > s_{max\text{-}peak}$, then $$w_j = W_2 \exp\left(-\frac{\beta \Delta t_j}{T_j}\right)$$

where $\beta$ is a target-class dependent tuning parameter and $w_j = w_3$ if there is no status and location history available for the $j^{th}$ candidate target, wherein the $j^{th}$ candidate target is a new uniquely identified target with $w_1 > w_2 > w_3$.

15. The computer readable storage medium of claim 9, wherein the speed-of-advance $s_1$ is estimated as $$s_1 = \frac{d_1^{min}}{\Delta t_1}$$

and the speed-of-advance $s_2$ is estimated as $$s_2 = \frac{d_2^{min}}{\Delta t_2},$$

where $d_1^{min}$ is the minimum obstacle-avoidance distance between $P_1$ and P, and $d_2^{min}$ is the minimum obstacle-avoidance distance between P and $P_2$, and where $\Delta t_1 = \max[1, T-T_1-c(S_1,S)]$ and $\Delta t_2 = \max[1, T_2-T-c(S,S_2)]$.

16. The computer readable storage medium of claim 15, wherein $d_1^{min}$ is calculated by $d_1^{min} = \max[0, d_{oa}(P_1,P) - u(P_1) - u(P)]$, where $d_{oa}(P_1,P)$ is the minimum target-class dependent obstacle avoidance distance from point $P_1$ to the point P, $u(P_1)$ is determined from the uncertainty of the target location point $P_1$, and $u(P)$ is determined from the uncertainty of the target location point P, and $d_2^{min}$ is calculated by $d_2^{min} = \max[0, d_{oa}(P,P_2) - u(P_2) - u(P)]$, where $d_{oa}(P, P_2)$ is the target-class dependent obstacle avoidance path between the point P to the point $P_2$ and $u(P_2)$ is determined from the uncertainty of the target location.

17. The computer readable storage medium of claim 16, wherein the target-class dependent obstacle avoidance distance calculation utilizes the Floyd-Warshall algorithm.

18. The computer readable storage medium of claim 1, wherein if the initial set of candidate targets comprises m initial candidate targets, total weight $w_t$ is defined as the sum of each individual weight $$w_j, w_t = \sum_{j=1}^{m} w_j.$$

then a data association probability $P_j$ with which a $j^{th}$ candidate target may be associated with the sensor data is determined by $$p_j = \frac{w_j}{w_t}.$$

19. The computer readable storage medium of claim 18, wherein a set of final candidate targets comprising n final candidate targets is selected from the initial set of candidate targets comprising m initial candidate targets based upon the calculated data association probabilities $P_j$ exceeding a threshold value calculated by statistical cluster analysis from the data association probabilities determined from all initial candidate targets, where $m \leq n$.

20. A system comprising:
   a display;
   a processor operatively connected to the display; and
   a memory module operatively connected to the processor, the memory module having program instructions stored therein, wherein the program instructions are executable by the processor to perform a method comprising the steps of:
      classifying input sensor data by comparing one or more measured target attributes with one or more known attributes of a finite set of uniquely identified targets;
      generating an initial set of one or more candidate targets based upon a comparison of the classified input sensor data with the known attributes of the finite set of uniquely identified targets;
      calculating a minimum required speed for each candidate target to travel between a geolocation history location and a location provided by the sensor data, the minimum required speed subject to both obstacle avoidance and status transition time constraints;
      assigning a statistical weight to each candidate target based upon its calculated minimum required speed;
      calculating a data association probability of each candidate target with the classified input sensor data; and
      generating a final set of candidate targets by selecting the candidate targets from the initial set of candidate targets having calculated data association probabilities that exceed a predetermined threshold value.

* * * * *